United States Patent
Yamazaki

(10) Patent No.: US 9,542,086 B2
(45) Date of Patent: Jan. 10, 2017

(54) INFORMATION PROCESSING APPARATUS INCLUDING WINDOW DISPLAY CONTROL AND CONTROL METHOD THEREOF, AND NON-TRANSITORY COMPUTER-READABLE MEDIUM

(71) Applicant: CANON KABUSHIKI KAISHA, Tokyo (JP)

(72) Inventor: Daisuke Yamazaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/636,042

(22) Filed: Mar. 2, 2015

(65) Prior Publication Data

US 2015/0169164 A1   Jun. 18, 2015

Related U.S. Application Data

(63) Continuation of application No. 13/962,659, filed on Aug. 8, 2013, now Pat. No. 8,982,395.

(30) Foreign Application Priority Data

Aug. 29, 2012   (JP) ................................ 2012-188929

(51) Int. Cl.
   *G06F 3/12*   (2006.01)
   *G06F 3/0486*  (2013.01)
   *G06F 3/0482*  (2013.01)
(52) U.S. Cl.
   CPC ........... *G06F 3/0486* (2013.01); *G06F 3/0482* (2013.01); *G06F 3/1203* (2013.01); *G06F 3/1204* (2013.01); *G06F 3/127* (2013.01); *G06F 3/1285* (2013.01)

(58) Field of Classification Search
   None
   See application file for complete search history.

(56) References Cited

U.S. PATENT DOCUMENTS 5,608,860 A * 3/1997 Fitzpatrick ............ G06F 3/0486
                                                       345/902
5,777,616 A   7/1998 Bates et al.
(Continued)

FOREIGN PATENT DOCUMENTS

JP   7-72858 B   8/1995
JP   2003-108281 A   4/2003
(Continued)

OTHER PUBLICATIONS

Adam Pash, "Turn Any Action a Keyboard Shortcut: A Beginner's Guide to Autokey" < http://lifehacker.com/316589/turn-any-action-into-a-keyboard-shortcut> Oct. 30, 2007.*
(Continued)

*Primary Examiner* — Ming Hon
(74) *Attorney, Agent, or Firm* — Fitzpatrick, Cella, Harper & Scinto

(57) ABSTRACT

An information processing apparatus, which issues a print instruction when a dragged file is dropped on a print object, the apparatus comprises: a layout unit configured to lay out the print object at a first position; and a display control unit configured to display, when the file is dragged, the print object at a second position which is closer to the dragged file than the first position by moving the print object from the first position.

15 Claims, 10 Drawing Sheets

(56) References Cited

U.S. PATENT DOCUMENTS

| | | | |
|---|---|---|---|
| 7,458,032 B2* | 11/2008 | Terada | G06F 3/0486 715/769 |
| 8,345,271 B2 | 1/2013 | Mori | |
| 2002/0054133 A1* | 5/2002 | Jameson | G06F 3/0481 715/788 |
| 2002/0059288 A1 | 5/2002 | Yagi et al. | |
| 2004/0163114 A1 | 8/2004 | Rodriguez et al. | |
| 2004/0172409 A1* | 9/2004 | James | G06K 9/0063 |
| 2005/0060653 A1* | 3/2005 | Fukase | G06F 3/0486 715/724 |
| 2005/0190405 A1 | 9/2005 | Tomita | |
| 2005/0286090 A1* | 12/2005 | Ahne | H04N 1/00384 358/452 |
| 2008/0259045 A1* | 10/2008 | Kim | G06F 3/0486 345/173 |
| 2010/0122194 A1* | 5/2010 | Rogers | G06F 3/04817 715/769 |
| 2010/0313165 A1 | 12/2010 | Louch et al. | |

FOREIGN PATENT DOCUMENTS

| | | |
|---|---|---|
| JP | 2003-241931 A | 8/2003 |
| JP | 2007-11701 A | 1/2007 |

OTHER PUBLICATIONS

Hirono, Tadatoshi, "Good to Know Windows 95 Tips Collection Part II", DOS/V Power Report vol. 8 No. 5, May 1998 issue appendix, Impress Corporation, vol. 8, p. 13, CSDB No. 199900071001, May 1998.

* cited by examiner

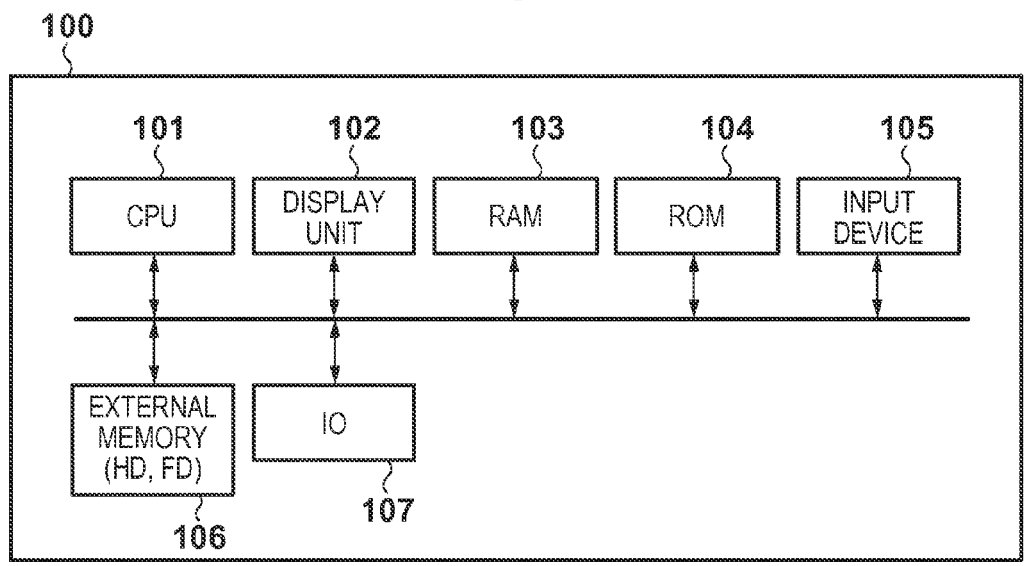
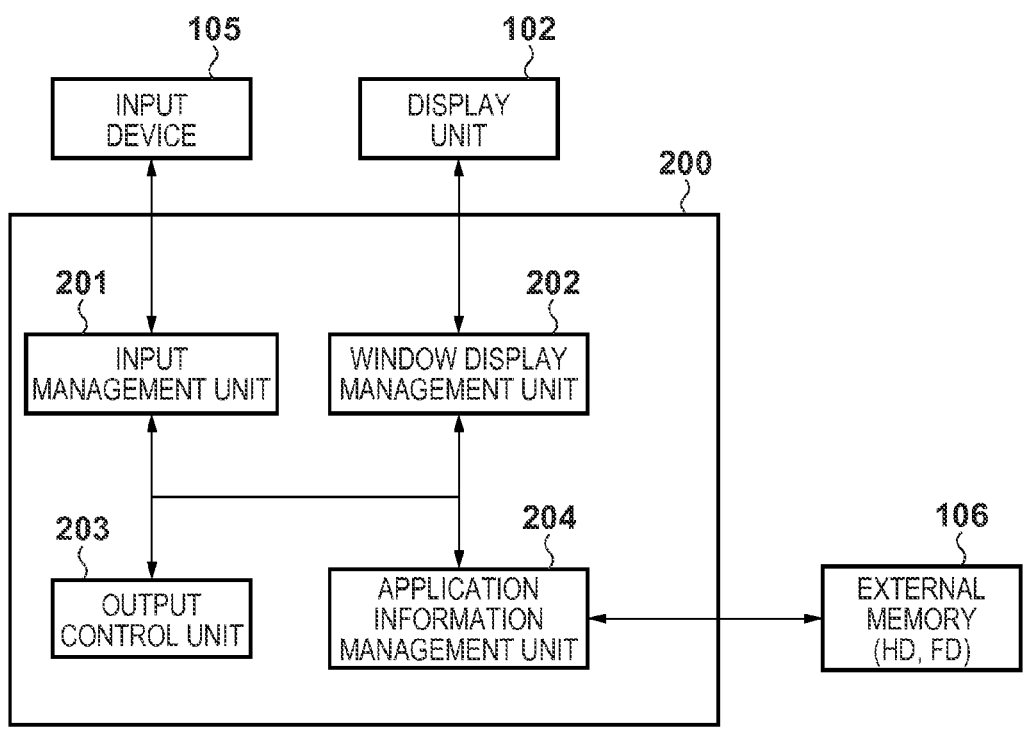

FIG. 4
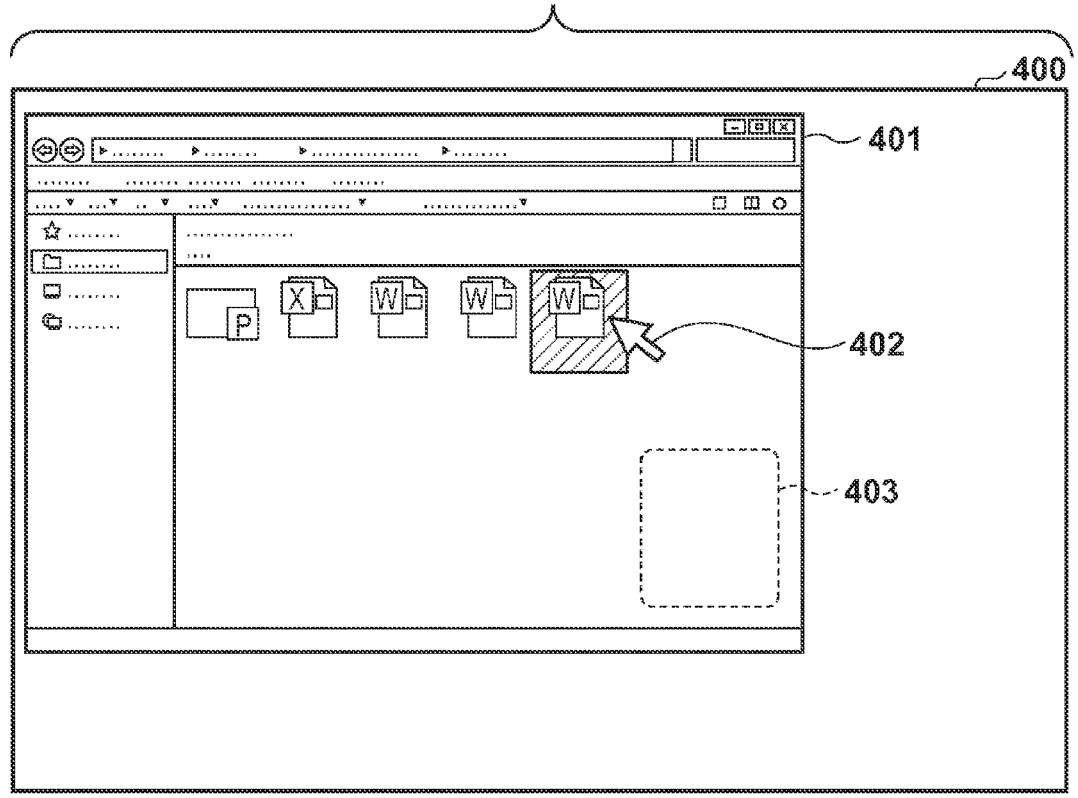
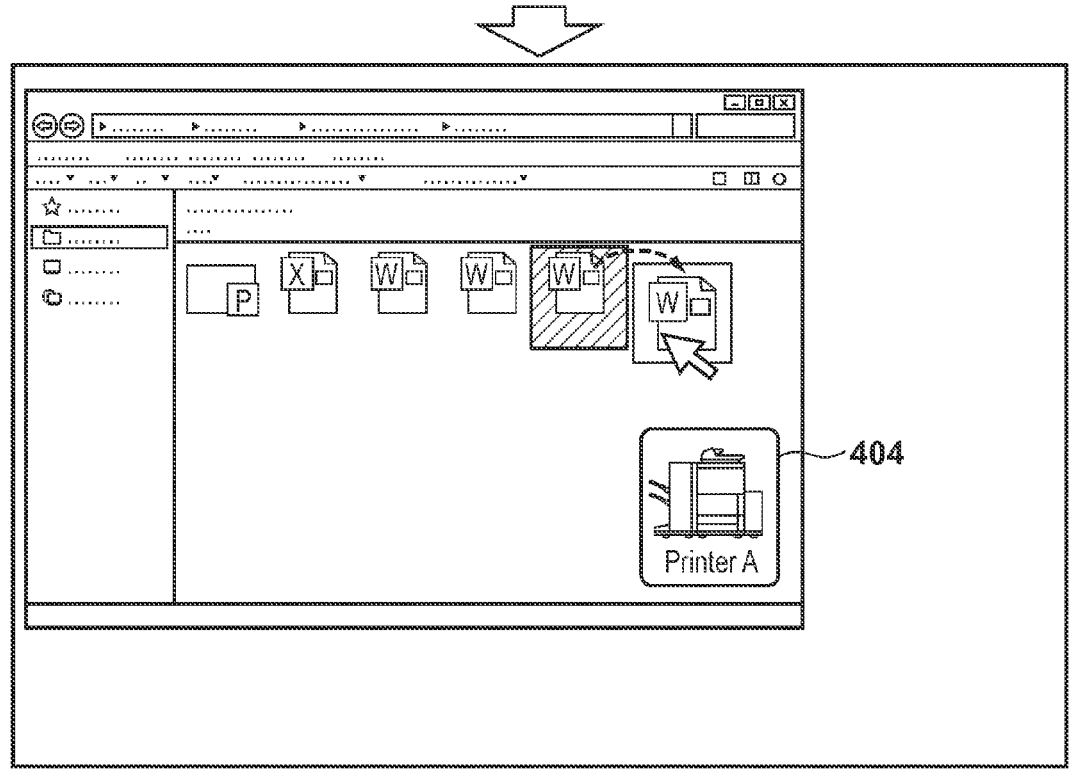

FIG. 5
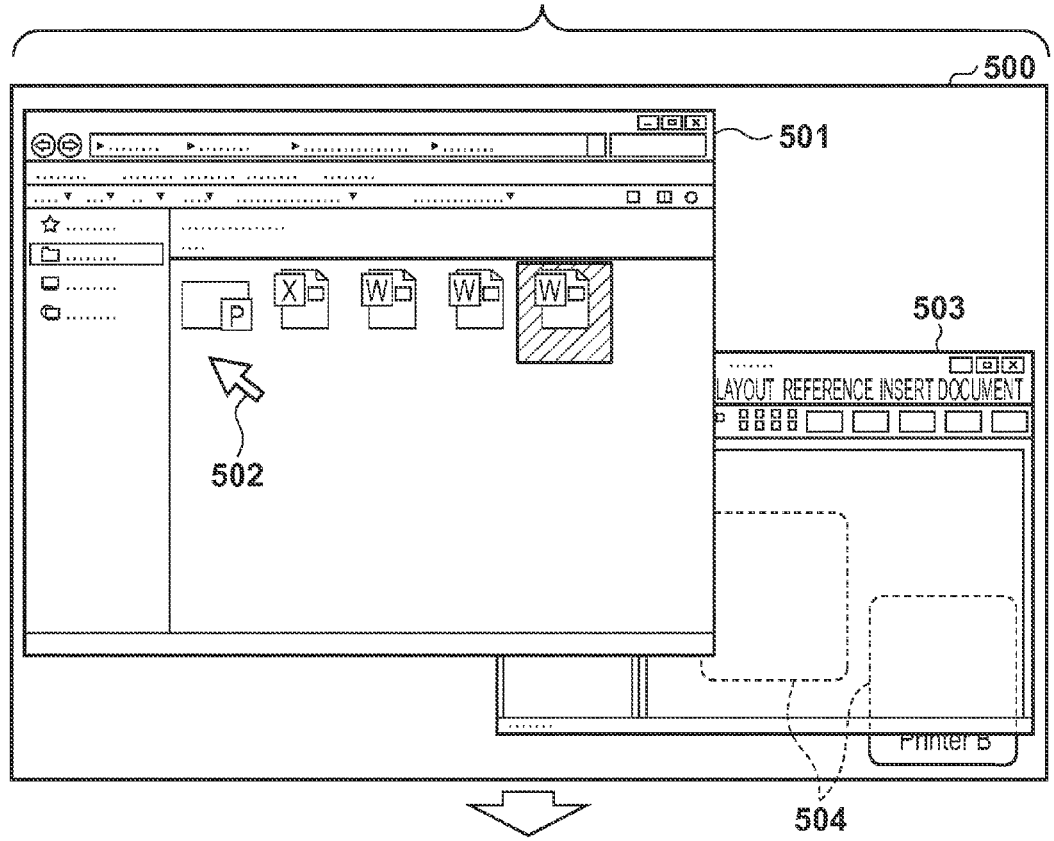
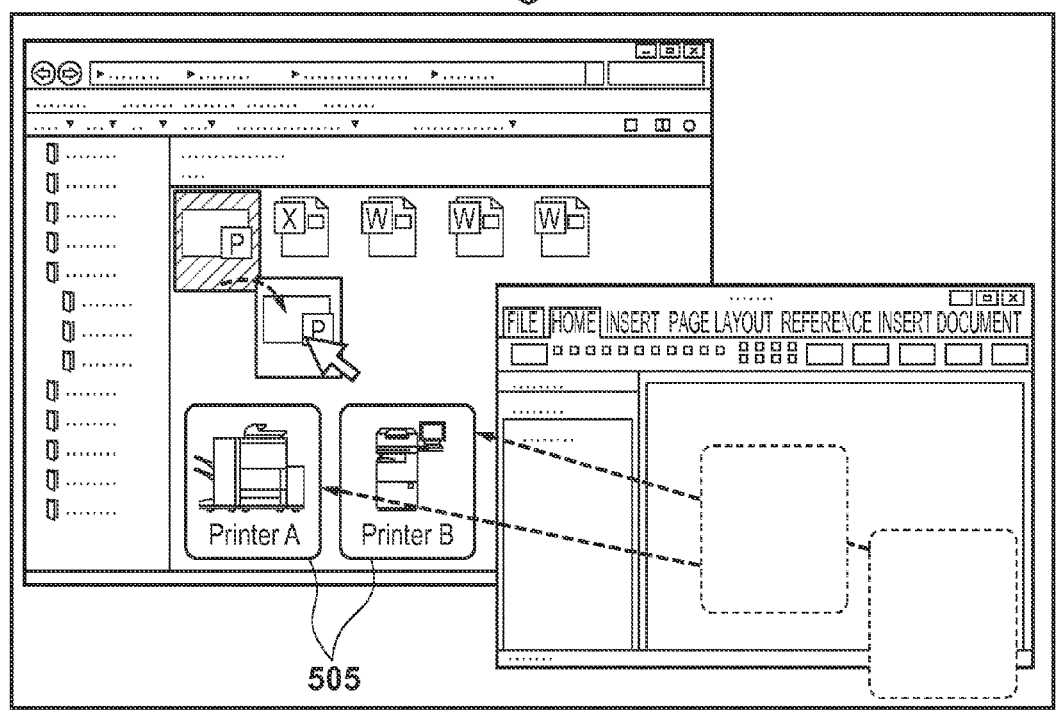

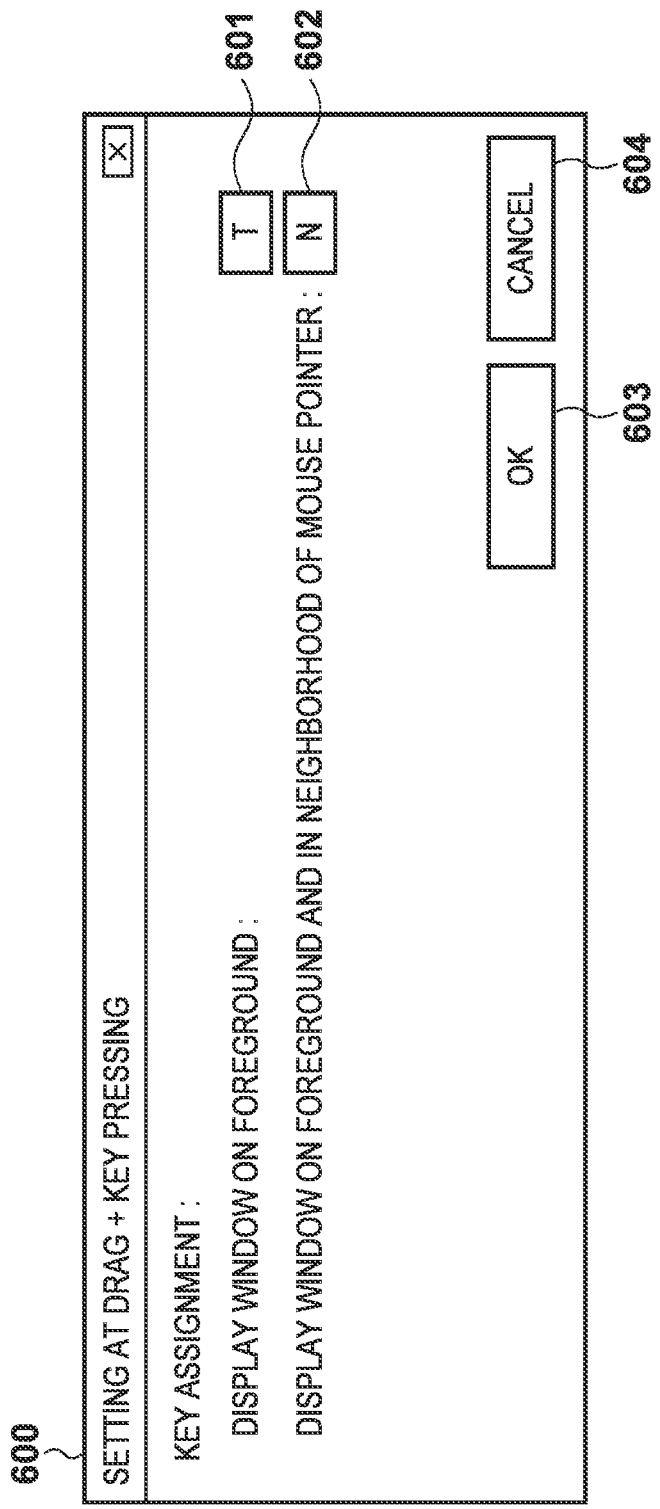

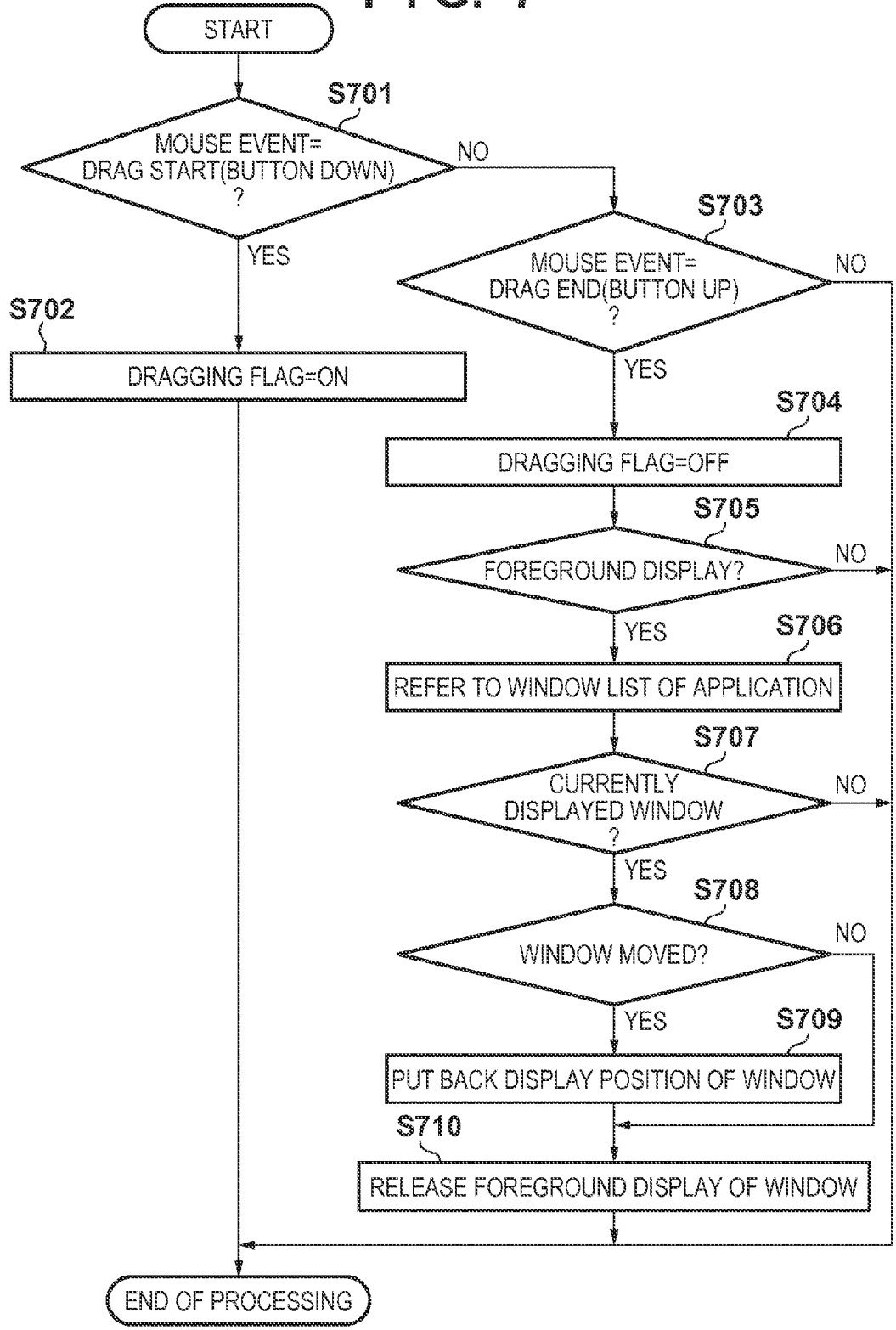

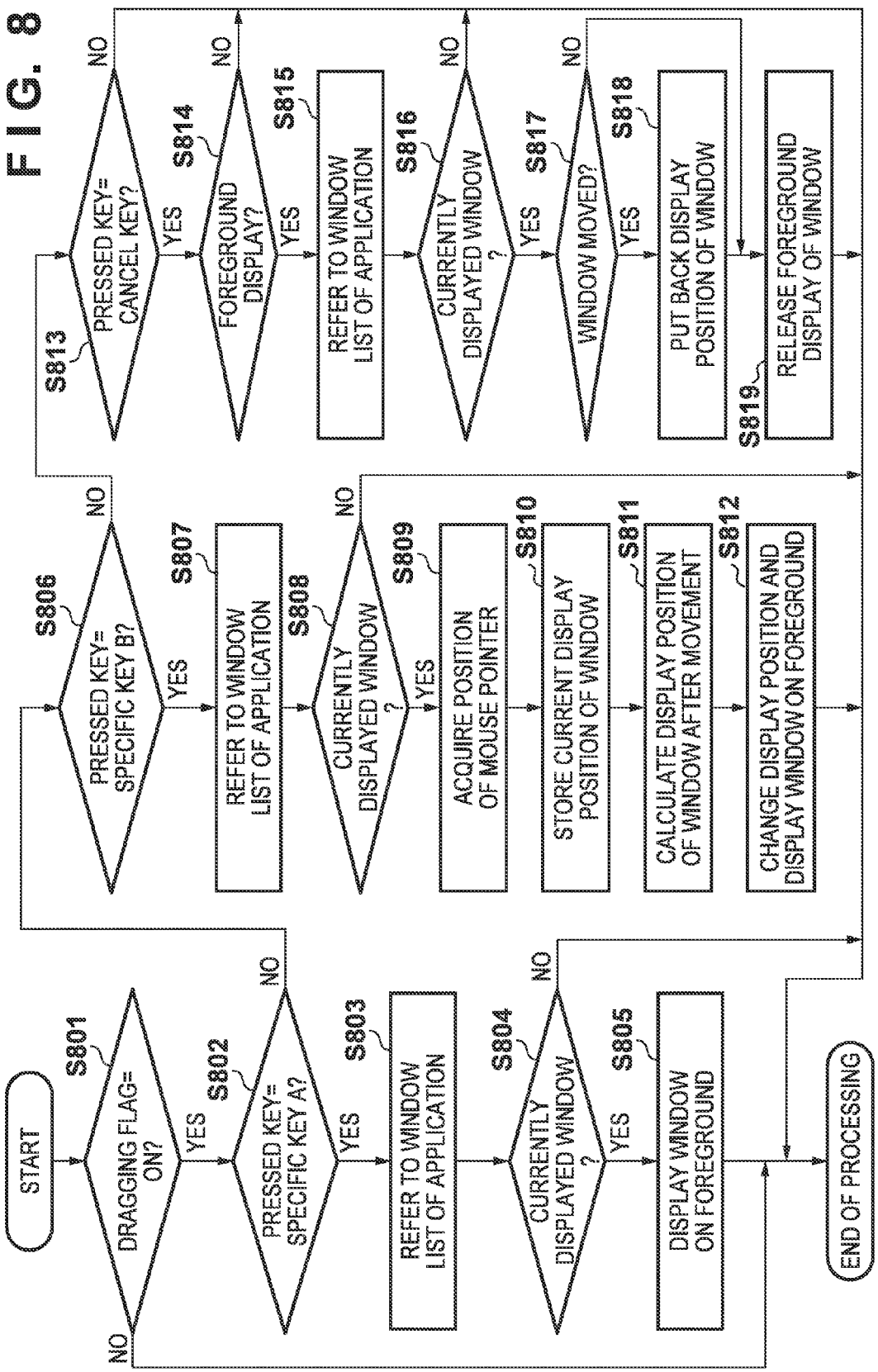

F I G. 9B
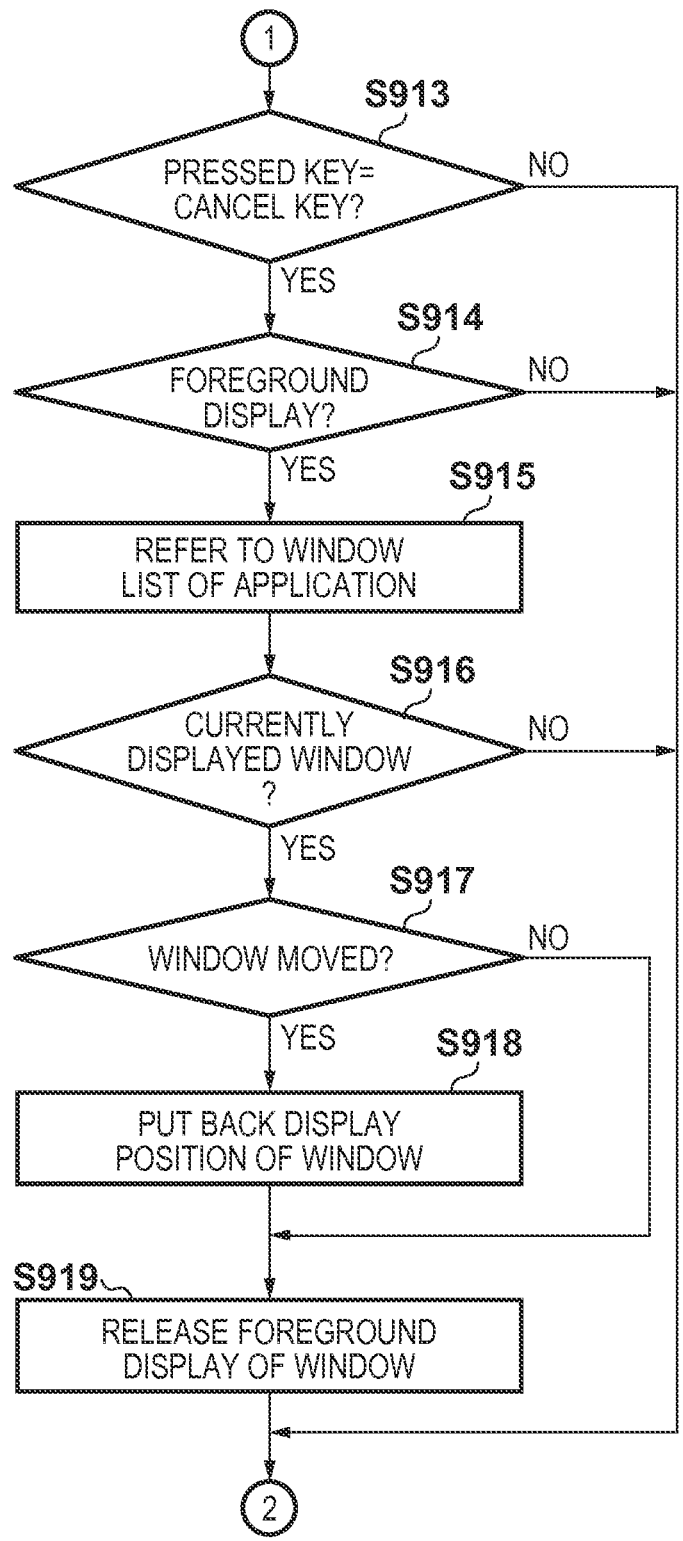

INFORMATION PROCESSING APPARATUS INCLUDING WINDOW DISPLAY CONTROL AND CONTROL METHOD THEREOF, AND NON-TRANSITORY COMPUTER-READABLE MEDIUM

This application is a continuation of U.S. Application No. 13/962,659 (pending), the contents which are incorporated herein by reference.

BACKGROUND OF THE INVENTION

Field of the Invention

The present invention relates to an information processing apparatus and control method thereof, and a non-transitory computer-readable medium and, more particularly, to window display control in an information processing apparatus which displays a plurality of windows.

Description of the Related Art

An information processing apparatus receives drag and drop operations for an object such as a file or folder. The drag and drop operations indicate a series of operations for designating an arbitrary object such as a file in a state in which a pointer of a pointing device (for example, a mouse) overlaps the object, moving (dragging) the object by moving the pointer in that state, and releasing (dropping) designation of the object at another location.

For example, when a drop destination window is covered and hidden behind another window, an object such as a file cannot be dropped on the drop destination window. In order to solve this problem, a technique for detecting start of a drag operation of an object in a window, judging a window of an application associated with the dragged object as a drop destination, and displaying that window on a foreground is available (see Japanese Patent Laid-Open No. 2003-108281).

Japanese Patent Laid-Open No. 2003-108281 describes that upon detection of a drag operation of an object in a window, a window of an application associated with the dragged object is displayed on a foreground. However, this reference does not consider that a window used to execute print processing is displayed to be easily operated by the user.

SUMMARY OF THE INVENTION

According to one aspect of the present invention, there is provided an information processing apparatus, which issues a print instruction when a dragged file is dropped on a print object, the apparatus comprising: a layout unit configured to lay out the print object at a first position; and a display control unit configured to display, when the file is dragged, the print object at a second position which is closer to the dragged file than the first position by moving the print object from the first position.

According to another aspect of the present invention, there is provided a control method of an information processing apparatus, which issues a print instruction when a dragged file is dropped on a print object, the method comprising: a layout step of laying out the print object at a first position; and a display control step of displaying, when the file is dragged, the print object at a second position which is closer to the dragged file than the first position by moving the print object from the first position.

According to another aspect of the present invention, there is provided a non-transitory computer-readable storage medium storing a program for controlling a computer, which issues a print instruction when a dragged file is dropped on a print object, to function as: a layout unit configured to lay out the print object at a first position; and a display control unit configured to display, when the file is dragged, the print object at a second position which is closer to the dragged file than the first position by moving the print object from the first position.

The present invention can improve operability of drag and drop operations.

Further features of the present invention will become apparent from the following description of exemplary embodiments (with reference to the attached drawings).

BRIEF DESCRIPTION OF THE DRAWINGS

FIG. 1 is a block diagram showing the hardware arrangement of an information processing apparatus;

FIG. 2 is a block diagram showing the software configuration of a window control application;

FIG. 4 is a view showing foreground display control of a window upon pressing of a specific key during a drag operation;

FIG. 5 is a view showing neighbor display control of a window upon pressing of a specific key during a drag operation;

FIG. 6 is a view showing a setting dialog associated with foreground display and neighbor display;

FIG. 7 is a flowchart showing an example of the processing sequence upon detection of a drag operation;

FIG. 8 is a flowchart showing processing upon detection of a key operation based on a key type;

FIGS. 9A and 9B are flowcharts showing processing upon detection of a key operation based on a window state.

DESCRIPTION OF THE EMBODIMENTS

Figure 3:
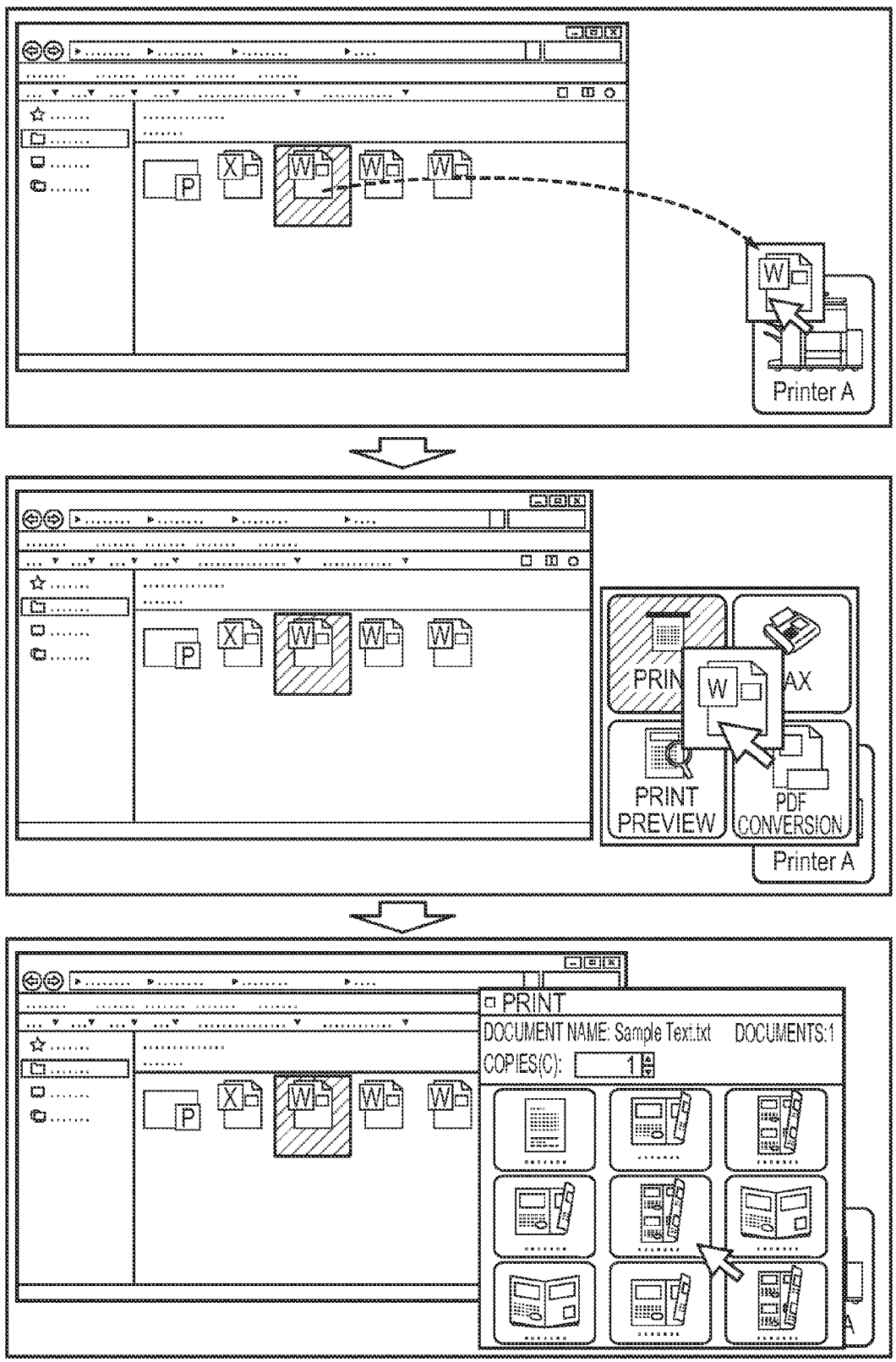
FIG. 3 is a view showing window display control at the time of a drag operation.

Embodiments of the present invention will be described hereinafter with reference to the drawings. Note that the following embodiments do not limit the present invention, and all arrangements described in the embodiments are not always indispensable for a method for solving the problems of the present invention.

<First Embodiment>

[Hardware Arrangement (Information Processing Apparatus)]

FIG. 1 is a block diagram showing the hardware arrangement of an information processing apparatus 100. Referring to FIG. 1, an input device 105 receives a user operation input from a keyboard, pointing device, and the like. The pointing device is used to operate a pointer and icon displayed on a display, and includes, for example, a mouse, touch panel, and the like. In the following description of this embodiment, the pointing device will be described as a mouse. Note that either the mouse or touch panel is configured to receive drag and drop operations.

The information processing apparatus 100 includes a display unit 102 which visually feeds back output information to the user. The information processing apparatus 100 includes a RAM 103 which stores various programs and execution information in this embodiment, an external memory 106 such as an HDD (Hard Disk Drive) and FDD (Flexible Disk Drive), and a ROM 104. Furthermore, the information processing apparatus 100 includes an I/O 107 used to communicate with an external apparatus. Note that the I/O 107 can be connected to peripheral devices irrespective of wired/wireless communications.

The information processing apparatus 100 includes a CPU 101 which executes programs. In this embodiment, the CPU 101 implements various kinds of software and processing to be described below by reading out and executing programs stored in the ROM 104 or the like.

[Software Configuration]

FIG. 2 is a block diagram showing an example of the software configuration of a window control application 200 executed by the information processing apparatus 100. The window control application 200 includes an input management unit 201, window display management unit 202, output control unit 203, and application information management unit 204. The input management unit 201 detects an operation of the input device 105 by the user via a UI (User Interface) of the window control application 200 displayed by the window display management unit 202, and acquires user operation information. The input management unit 201 monitors operation events of the mouse and keyboard processed by an OS (Operating System) in addition to operations on the UI displayed by the window display management unit 202, thus detecting a user input operation. The window display management unit 202 executes processing related to window display control such as display of the UI of the window control application 200, detection of a user operation with respect to the UI, and the like.

Upon reception of a user operation on the UI, the window display management unit 202 instructs the output control unit 203 to execute corresponding processing according to that operation. The output control unit 203 executes various kinds of output processing according to user operations received via the window display management unit 202. Note that processing to be executed by the output control unit 203 is not particularly limited, and the output control unit 203 can execute arbitrary processing in response to a user instruction. The arbitrary processing may include, for example, processing for instructing to move or copy a dropped object.

Processing of this embodiment includes, for example, an output instruction to an image processing apparatus (not shown) including print and FAX functions, preview display of the contents of a dropped file, and file format conversion processing of a dropped file. When a user's output instruction is a print instruction, the output control unit 203 issues an output instruction to a print driver. When a user's output instruction is a FAX transmission instruction, the output control unit 203 issues an output instruction to a FAX transmission driver. Each driver which receives the instruction converts a file designated by the output instruction into output instruction information which can be interpreted by the image processing apparatus (not shown).

The output instruction information indicates information converted into a print data format (for example, PDL (Page Description Language) or the like) in case of a print output. In case of FAX transmission, the output instruction information indicates information converted into a FAX transmission data format (for example, raster data or the like). The driver transmits the converted output instruction information to the image processing apparatus (not shown) via a network such as a LAN (Local Area Network). Then, the image processing apparatus (not shown) implements an output based on the received output instruction information.

When a user's output instruction is a preview display instruction, the window display management unit 202 displays a UI window (not shown) used to display a print preview of a file. The user may change print settings while confirming that print preview to execute print processing. On the other hand, when a user's output instruction is a format conversion instruction, the output control unit 203 executes processing for converting a file into a general-purpose format such as PDF (Portable Document Format).

A file as a target of output processing can be identified by acquiring, for example, a file storage location (file path) list from a drop source application when that file is dropped. The window control application 200 processes output processing for a file identified from the file storage location list. The application information management unit 204 manages settings and states of the application while the window control application 200 is active. The application information management unit 204 executes read/write processing of the settings and states of the application with respect to a setting file in the external memory 106.

[Display Control Upon Dragging]

FIG. 3 is a view showing window display control at the time of a drag operation to a print window (print object) displayed by the window control application 200.

A desktop window 300 indicates that displayed by the OS. On the desktop window 300, a UI of an arbitrary application can be displayed, and the user can execute desired jobs by operating UIs of various applications. A window 301 indicates that provided by a general file browsing application. The window 301 displays folders and files, and receives operations for these folders and files. Assume that the file browsing application which provides the window 301 is different from the window control application 200.

A print window 302 indicates an object provided by the window control application 200, and is displayed on the desktop window 300. The print window 302 receives drag and drop operations of a file. Note that objects provided by respective applications are not limited to the configuration shown in FIG. 3. The configuration of objects is not particularly limited as long as it can receive drag and drop operations of a file to be processed from one object to the other object. For example, a drag destination object may be a window object which displays a file list like the window 301 or may be a GUI (Graphical User Interface) like the print window 302. As an example of the GUI such as the print window 302, a widget is known.

A menu 303 shows a window display example when a file is dragged to the print window 302 of the window control application 200. When a drag operation to the print window 302 by the user is received, the window control application 200 displays the menu 303 used to select an output type. In this case, the menu 303 presents four output processes, that is, print, FAX transmission, print preview, and PDF conversion. When the user drops a file onto a desired output process position of the output processes presented by the menu 303, he or she can issue an output processing instruction to the window control application 200.

A menu 304 is a window which is provided by the window control application 200 and is required to designate detailed print settings for print processing. The menu 304 is displayed by the window control application 200 when the user drops a file onto a portion corresponding to the print processing on the menu 303. The menu 304 includes a copy count designation field 305 used to designate the number of copies and a print template selection field 306 used to designate print settings. Each print template is prepared by combining print settings to be popularly used in advance. The user selects a print template displayed on the print template selection field 306, thereby issuing a print execution instruction while reflecting the print settings of that template.

Note that the windows to be displayed may be other windows or may have other window configurations. For example, a window required for output settings of a driver associated with a drop destination of the window control application 200 may be called.

[Window Display Control (Foreground Display)]

A detailed problem in this embodiment will described below. As in the aforementioned related art, a drag operation of an object is detected, and a window associated with the object to be dragged is merely displayed on a foreground, thus posing a problem that a window is displayed on the foreground against the user's intention. Hence, this embodiment provides a window display control method which can remove such burden and can improve operability upon drag and drop operations. This embodiment also considers that not only a window associated with an object (file or the like) to be dragged is display on the foreground at that position but also it is displayed at a position where the user is allowed to make easy operations.

FIG. 4 is a view showing foreground display control when a print window of the window control application 200 is hidden behind another window since that window overlaps and covers the print window. Note that the foreground display in this embodiment is to display the print window at a foremost position on the display of the display unit 102. The print window is displayed on the foreground by the window control of the OS when its state (attribute) is designated so that the print window is to be displayed on the foreground. However, the object of the foreground display processing is to display the hidden print window on a front position where the user can operate (recognize) that window. Hence, when the print window is hidden behind another window, the display order may be merely replaced so that the print window is displayed in front of the other window which hides the print window. Note that the present invention will continue a description using an example in which the print window is displayed on the foreground.

A desktop window 400 represents that displayed by the OS. A window 401 is that of a general file browsing application different from the window control application 200. A pointer 402 is a mouse pointer which is used to make drag and drop operations for a file. A broken line 403 indicates the position of the print window of the window control application 200, which is hidden behind the window 401. For example, when the user wants to drag and drop a file in the window 401 onto the print window, he or she cannot drop the file since the print window as a drop destination is hidden in this state.

A print window 404 indicates a window of the window control application 200. That is, the lower view of FIG. 4 expresses a state in which the window control application 200 displays the print window 404 on the foreground when it detects a user's drag operation and a pressing operation of a specific key during the user's drag operation. Thus, even when the print window is hidden behind another window, as indicated by the broken line 403, since it is controlled to be displayed on the foreground like the print window 404, the user can execute a drop operation. Note that the specific key is a predetermined key input value ("A" or the like) using the keyboard, and the user can change that specific key using a setting dialog (FIG. 6; to be described later). Note that the following description will be given under the assumption that the key input is made using the keyboard. However, the present invention is not limited to this. For example, an arbitrary button provided by the information processing apparatus 100 may be used. Also, when the information processing apparatus 100 has a touch panel type display, the user may be allowed to make a key input from a keyboard displayed on the display.

During display on the foreground, the print window 404 is displayed to always be located in front of another window on the display. The window control application 200 ends the display on the foreground when it detects canceling of the drop operation (to release file designation) or execution of the drop operation (or start of output processing).

[Window Display Control (Foreground+Neighbor Display)]

The control shown in FIG. 4 can improve the operability when the print window as a drop destination is hidden behind another window at the time of drag and drop operations. However, when the print window as a drop destination is far from a drag position of a file on the display, an operation for moving the file from the drag position to the print window imposes heavier load on the user. Even in such case, it is desirable to attain easy drag and drop operations.

FIG. 5 is a view for explaining processing executed when the print window of the window control application 200 is hidden behind another window, and the position of a file to be dropped is far from the print window. Processing for displaying the print window at a position which is nearer a file to be processed than a display position of the print window initially laid out by the window control application on the display will be described as neighbor display.

Note that upon execution of the neighbor display, a move destination of the print window may be either the neighborhood of the drag position of a file or that of the pointer of the pointing device (for example, mouse). Furthermore, when the print window is controlled to be moved to the neighborhood of the pointer position, the print window of the window control application 200 may be moved to follow the movement of the pointer in a drag state.

In the neighbor display of this embodiment, the user may set a distance to a position where the print window is to be moved and displayed on the display.

A desktop window 500 represents that displayed by the OS. A window 501 indicates that of a general file browsing application different from the window control application 200. A pointer 502 is a mouse pointer used upon making drag and drop operations for a file. A window 503 indicates that of a general document creation application different from the window control application 200, and is used to support creation of a document file.

Broken lines 504 indicate print windows of the window control application 200, which are hidden behind the window 503. In this case, assume that two print windows are hidden. In this case, the neighbor display of both the two print windows is executed. Even when more print windows are used, they may be similarly processed, or the neighbor display of only one of these windows may be executed.

For example, when the user wants to drag and drop a file in the window 501 onto the print windows indicated by the broken lines 504, he or she cannot drop the file since the windows as drop destinations are hidden in this state. Also, the pointer position is far from each print window as a drop destination on the display, and movement by the drag operation imposes a heavy load on the user.

Print windows 505 indicate those of the window control application 200. Then, the lower view of FIG. 5 expresses a state in which the window control application 200 displays the print windows 505 on the foreground and in the neighborhood of the pointer 502 when it detects a drag operation of the user and a pressing operation of a specific key during the drag operation. That is, even when the print windows are hidden behind another window such as the window 503, and the drag position is far from the print windows, the print windows are displayed on the foreground and in the neighborhood of the pointer like the print windows 505. Thus, the user can easily execute the drop operation.

In this embodiment, during the foreground display and neighbor display of the window as a drop destination, that window is displayed to always be located in front of another window and in the neighborhood of the mouse pointer on the display. Upon detection of canceling of the drop operation or execution of the drop operation (or start of output processing), the foreground display and neighbor display of the window end, and the display position of the window is put back to an original position. Note that in addition to the window control methods shown in FIGS. 4 and 5, the window of the window control application 200 may be displayed at a front position when the user clicks an icon displayed on a notification area (for example, a task tray) of the OS (not shown).

[Setting Dialog of Window Display Control]

FIG. 6 is a view showing a setting dialog associated with the foreground display and neighbor display of the window control application 200.

A setting dialog 600 indicates that used to set an operation upon pressing of a specific key during a drag operation of the window control application 200. A key designation field 601 receives designation of a key required to display the print window of the window control application 200 on the foreground. Upon detection of pressing of a key ("T" in FIG. 6) designated in this field during a drag operation, the window control application 200 displays the self print window on the foreground. A key designation field 602 receives designation of a specific key required to display the window of the window control application 200 on the foreground and in the neighborhood of the mouse pointer. Upon detection of pressing of a key ("N" in FIG. 6) designated in this field during a drag operation, the window control application 200 displays the self print window on the foreground and in the neighborhood of the mouse pointer like the print windows 505 shown in FIG. 5. Note that the window control application 200 can receive the same key in the key designation fields 601 and 602 in FIG. 6. In a state in which the same key is received in FIG. 6, when the user presses that key during dragging, the window control application 200 preferentially executes the operation (foreground and neighbor display) of the key designation field 602.

Also, the user presses an OK key 603 to reflect the keys set in the key designation fields 601 and 602 to the operation of the window control application 200. When the user presses a cancel button 604, the setting operation is aborted without reflecting any settings. Note that items settable on the setting dialog 600 are not limited to those described above, and more detailed settings may be allowed. Note that the present invention has as its object to display a window used to execute print processing so as to be easily operated by the user. For this reason, the print window may be displayed on the foreground in response to the drag operation of a file. That is, the window control application may display the print window on the foreground without receiving any specific key input. Alternatively, the window control application may execute the foreground display and neighbor display of the print window in response to the drag operation of a file without receiving any specific key input.

Note that the application information management unit 204 stores key setting values in a setting file in the external memory 106 as application information.

[Processing Sequence Upon Detection of Mouse Operation]

FIG. 7 is a flowchart showing an example of the processing sequence of the window control application 200 upon detection of a drag operation according to this embodiment. By detecting a mouse operation by the user, processing for setting a flag indicating that a drag operation is in progress to be ON/OFF or putting a window back to an original position when the window is moved is executed.

Note that in the present invention, respective steps of the flowchart are implemented when the CPU 101 loads a program of the window control application 200 stored in the ROM 104 or external memory 106 onto the RAM 103 and executes the loaded program. This processing is started when the input management unit 201 monitors a mouse operation processed by the OS and detects the mouse operation. An event generated by the mouse operation will be described as a mouse event hereinafter.

Upon detection of a mouse event processed by the OS, the input management unit 201 refers to event information of the mouse event, and determines in step S701 whether or not that event is a left mouse button down event. The event information of the mouse event in this step can be acquired from the OS. The event information indicates a button down/up event each for the right and left mouse buttons, movement of the mouse, and the like. Thus, the mouse operation can be recognized. The button down event in this case indicates a state in which the user holds down the mouse button, and the button up event indicates a state in which the user releases the held-down button. The mouse operation to be described below is premised on settings of operations by the right hand. Therefore, when the settings related to mouse operations are changed from prescribed values (for example, when the roles of the right and left mouse buttons are reversed), the right and left mouse buttons in the following processing are also reversed.

If the mouse event is the left mouse button down event (YES in step S701), the input management unit 201 sets a flag indicating whether or not a drag operation is currently in progress (to be referred to as a dragging flag hereinafter) to be ON (true) in step S702. On the other hand, if the input management unit 201 determines that the event is different from the left mouse button down event (NO in step S701), it determines in step S703 whether or not the event is a left mouse button up event.

If the event is the left mouse button up event (YES in step S703), the input management unit 201 sets the dragging flag to be OFF (false) in step S704. After that, the process advances to step S705. On the other hand, if the event is different from the left mouse button up event (NO in step S703), this processing sequence ends. Subsequent processes of steps S705 to S710 indicate the foreground display or neighbor display release processing upon detection of release of a drop operation.

After the process of step S704, the input management unit 201 sends an inquiry to the window display management unit 202 to confirm in step S705 whether or not execution of the foreground display processing of the print window is currently in progress. Step S705 is implemented by confirming a flag associated with the foreground display. If the execution of the foreground display processing is not in progress (NO in step S705), this processing sequence ends. If execution of the foreground display processing is in progress (YES in step S705), the input management unit 201 requests the application information management unit 204 to send a print window list managed by the application in step S706. Upon reception of the request, the application information management unit 204 returns a window instance list to the input management unit 201.

After the window list is acquired, the input management unit 201 refers to attribute information of respective windows and determines in step S707 whether or not the window list includes a currently displayed print window. In the attribute information, various settings indicating a state and the like of each print window are specified. In this case, information indicating at least whether or not a print window is being displayed on the display is included. If the window list does not include any currently displayed print window (NO in step S707), this processing sequence ends.

If the window list includes a currently displayed print window (YES in step S707), the input management unit 201 confirms in step S708 whether or not the currently displayed print window has been moved for the neighbor display. This can be determined by confirming whether or not an original position of the print window is stored at the time of moving processing of the print window by the neighbor display. Detailed contents of this processing will be described later with reference to FIG. 8. Only when the print window has been moved (YES in step S708), the input management unit 201 refers to original position information of the print window and puts back the position of the print window to the original position in step S709. In step S710, the input management unit 201 releases the foreground display of the print window, thus ending the processing.

[Processing Sequence Upon Detection of Key Operation]

FIG. 8 is a flowchart showing an example of the processing sequence of the window control application 200 upon detection of a key operation according to this embodiment. By detecting a user's input operation using the keyboard as the input device 105, the foreground display processing and neighbor display processing of the window control application 200 are executed according to a type of a pressed key. An event generated when the user operates the keyboard will be referred to as a key event hereinafter.

This processing is started when the input management unit 201 monitors a key event processed by the OS, and detects the key event.

Upon detection of a key event, the input management unit 201 determines in step S801 whether or not a drag operation is currently in progress. This determination process is attained by referring to the dragging flag designated in the aforementioned processing of FIG. 7. If a drag operation is not in progress (NO in step S801), this processing sequence ends. If a drag operation is in progress (YES in step S801), the input management unit 201 refers to event information of the key event in step S802. Then, the input management unit 201 determines whether or not the pressed key matches a key used to execute the foreground display processing of the window. This key will be described as a specific key A hereinafter, and the specific key A is designated using the key designation field 601 in FIG. 6.

If the pressed key matches the specific key A (YES in step S802), the input management unit 201 requests the application information management unit 204 to send a print window list managed by the application in step S803. Upon reception of the request, the application information management unit 204 returns a window instance list to the input management unit 201. After the window list is acquired, the input management unit 201 refers to attribute information of respective print windows and determines in step S804 whether or not the window list includes a currently displayed print window. The list returned from the application information management unit 204 includes print windows which are provided by the window control application 200 and are displayed on the foreground when a file is dragged.

If the list does not include any currently displayed window (NO in step S804), this processing sequence ends. If the list includes a currently displayed print window (YES in step S804), the input management unit 201 instructs the window display management unit 202 to display the currently displayed print window provided by the window control application 200 on the foreground in step S805. More specifically, by enabling foreground display attribute information of the window, the OS processes to display that window on the foreground on the display. In step S805 above, when a file is dragged while the print window is covered by another window, the window control application can display the print window in front of the other window. Note that when the foreground display is executed, a foreground display flag is set ON.

If the pressed key does not match the specific key A (NO in step S802), the input management unit 201 determines in step S806 whether or not the pressed key matches a key used to execute the foreground display and neighbor display. This key will be described as a specific key B hereinafter, and the specific key B is designated using the key designation field 602 in FIG. 6. If the pressed key matches the specific key B (YES in step S806), the input management unit 201 sends a request to the application information management unit 204, and acquires a print window list managed by the application in step S807. The list acquired from the application information management unit 204 includes print windows which are provided by the window control application 200 and are displayed on the foreground and at neighboring positions when a file is dragged.

Then, the input management unit 201 refers to attribute information of respective print windows and determines in step S808 whether or not the window list includes a currently displayed print window. If the list does not include any currently displayed window (NO in step S808), this processing sequence ends. If the list includes a currently displayed print window (YES in step S808), the input management unit 201 sends a request to the OS and acquires the display position of the mouse pointer on the display in step S809. In step S810, the input management unit 201 instructs the window display management unit 202 to store the current display position of the currently displayed print window. Upon reception of the instruction, the window display management unit 202 stores the display position of the currently displayed print window on the display.

In step S811, the input management unit 201 calculates a position after movement of the print window for the neighbor display based on the position information of the mouse pointer acquired in step S809. Note that the calculation processing of the position after movement is processing for deciding a display position of the window on the display. At this time, the position of the print window after movement may fall outside a display range of the display depending on the position of the mouse pointer. In order to avoid this, for example, when the mouse pointer is located on the right side on the display, the print window is moved to be located on the left side of the mouse pointer. On the other hand, when the mouse pointer is located on the left side on the display, the display position is decided to locate the print window on the right side of the mouse pointer. When a plurality of print windows are to be moved, positions are decided using information of a height and width of each print window to lay out the print windows to be spaced at a given interval so as to fall within the display range of the display. Note that the moved position of the print window is not limited to the aforementioned method, and the position may be set by the user, or may be changed according to the size and the like of the print window.

In step S812, the input management unit 201 instructs the window display management unit 202 to change the position of the print window to that calculated in step S811, and to further display the currently displayed print window on the foreground.

If the pressed key does not match the specific key B (NO in step S806), the input management unit 201 determines in step S813 whether or not the pressed key matches a cancel key. As the cancel key in this case, an Escape key on the keyboard is known, but another key may be set and used as a cancel key. If the pressed key does not match the cancel key (NO in step S813), this processing sequence ends. If the pressed key matches the cancel key (YES in step S813), the input management unit 201 inquires the window display management unit 202 to determine in step S814 whether or not execution of the foreground display processing of the print window is currently in progress. If execution of the foreground display processing is not in progress (NO in step S814), this processing sequence ends.

If execution of the foreground display processing is in progress (YES in step S814), the input management unit 201 requests the application information management unit 204 to send a print window list managed by the application in step S815. Upon reception of the request, the application information management unit 204 returns a window instance list to the input management unit 201. After the window list is acquired, the input management unit 201 refers to attribute information of respective print windows and determines in step S816 whether or not the window list includes a currently displayed print window.

If the list does not include any currently displayed window (NO in step S816), this processing sequence ends. If the list includes currently displayed print windows (YES in step S816), the input management unit 201 confirms in step S817 whether or not the currently displayed print windows include that which has been moved for the neighbor display. This can be determined by confirming whether or not the currently displayed print windows include that having the original position information stored in step S810.

Only when the input management unit 201 determines that the print windows include that which has been moved (YES in step S817), the input management unit 201 refers to the stored original position information of the print window stored, and puts back the position of the print window to that original position in step S818. In step S819, the input management unit 201 releases the foreground display of the window, and ends the processing.

[Print Processing Sequence]

Figure 10:
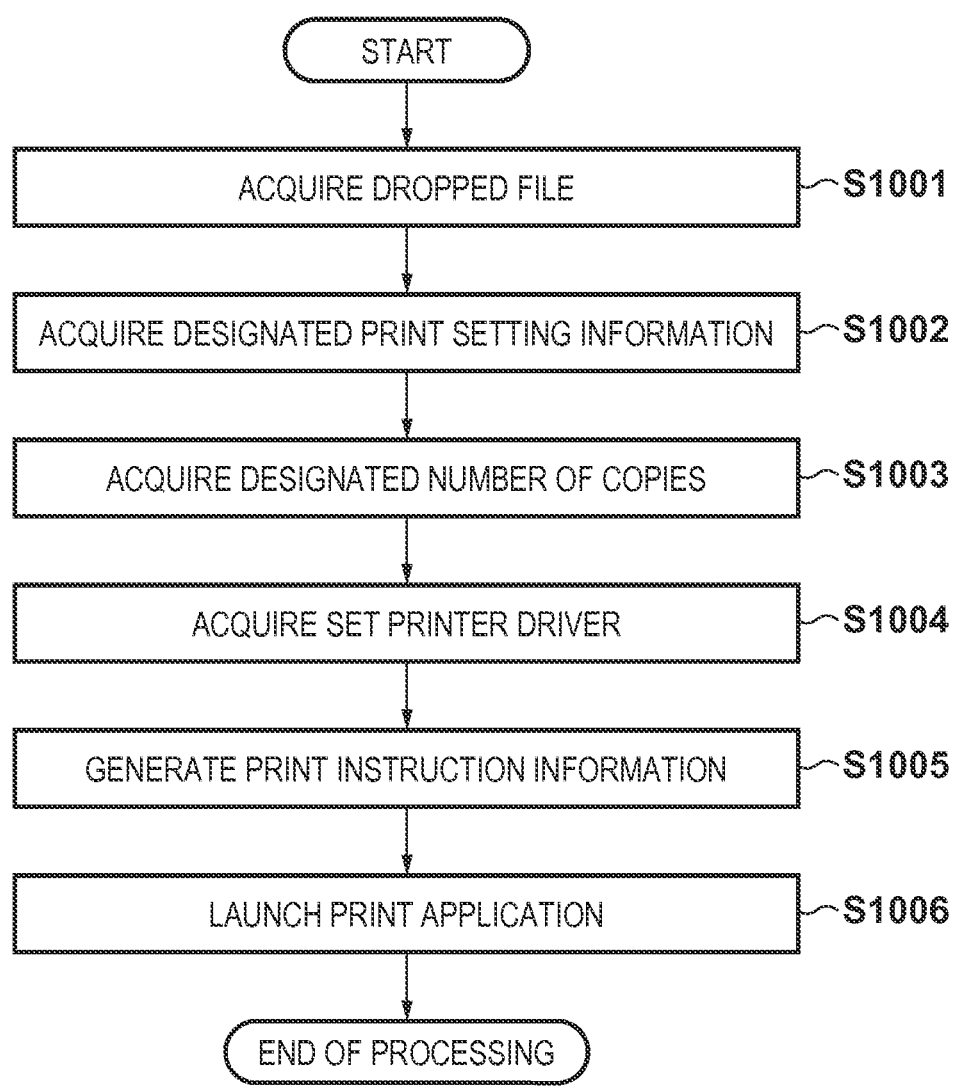
FIG. 10 is a flowchart showing an example of print instruction processing.

FIG. 10 is a flowchart showing an example of the print processing sequence of the window control application 200 according to this embodiment. Upon reception of a print execution instruction based on a user's drop operation of a file onto the print window, the window control application 200 calls a print application (not shown), and issues a print instruction to the image processing apparatus (not shown).

This processing is started when a drop operation of a file onto the window of the window control application 200 is received (menu 303) to receive a print execution instruction on the print setting window (menu 304), as shown in FIG. 3.

Upon reception of a user's print execution instruction via the window display management unit 202, the window control application 200 instructs the output control unit 203 to start print processing. That is, upon reception of a drop operation of a file onto the print window, the window control application 200 instructs to start the print processing. Upon reception of the print processing start instruction, the output control unit 203 instructs the input management unit 201 to acquire information of the dropped file in step S1001. The information to be acquired indicates that (file path) required to identify a storage location of the file.

Subsequently, the output control unit 203 requests the window display management unit 202 to acquire print setting information designated on the print template selection field 306 used to designate print settings in step S1002. In step S1003, the output control unit 203 acquires copy count information designated in the copy count designation field 305. Next, in step S1004, the output control unit 203 instructs the application information management unit 204 to acquire driver information used in print output processing associated with the target window.

In step S1005, the output control unit 203 generates print instruction information required to issue a print instruction based on the file information, print setting information, copy count information, and driver information used in the print output processing, which are acquired in steps S1001 to S1004. In step S1006, the output control unit 203 launches the print application by designating the generated print instruction information. The print application is required to execute print processing. Upon reception of the print instruction information from the window control application 200, the print application transmits the print instruction information to the designated driver, and issues a print instruction. More specifically, the print instruction is issued by calling an interface required for the print processing by designating the designated file, designated print settings, and designated number of copies in the print instruction information.

Upon reception of the instruction, the driver converts the designated file into output instruction information which can be interpreted by the image processing apparatus (not shown). As the output instruction information in this case, the file is converted into a print data format (for example, PDL (Page Description Language) or the like) in case of the print output processing. The driver transmits the converted print instruction information to the image processing apparatus (not shown) via a network, thus executing the print processing. After that, the processing of this processing sequence ends.

Note that this embodiment has exemplified the print processing via the print application which issues a print instruction. Alternatively, the window control application 200 may call an interface of a driver, and may directly transmit a print instruction to the driver. As described above, in the present invention, in cooperation of the application and driver, the information processing apparatus can issue a print instruction of a file dropped on the print window (print object).

<Second Embodiment>

In the processing sequence upon detection of a key operation in the first embodiment (FIG. 8), window control is changed according to a type of a pressed key. Alternatively, display processing may be controlled based on a window state in place of a key type. In place of switching processing using a plurality of keys, processing using a single key allows easier user operations.

Thus, in this embodiment, foreground display processing and neighbor display processing to be executed according to a window state when the user presses a key will be described below with reference to FIGS. 9A and 9B. Note that this embodiment uses the same arrangements shown in FIGS. 1 to 7 and FIG. 10 of the first embodiment, and a description thereof will not be repeated.

[Processing Sequence Upon Detection of Key Operation]

Figure 9A:
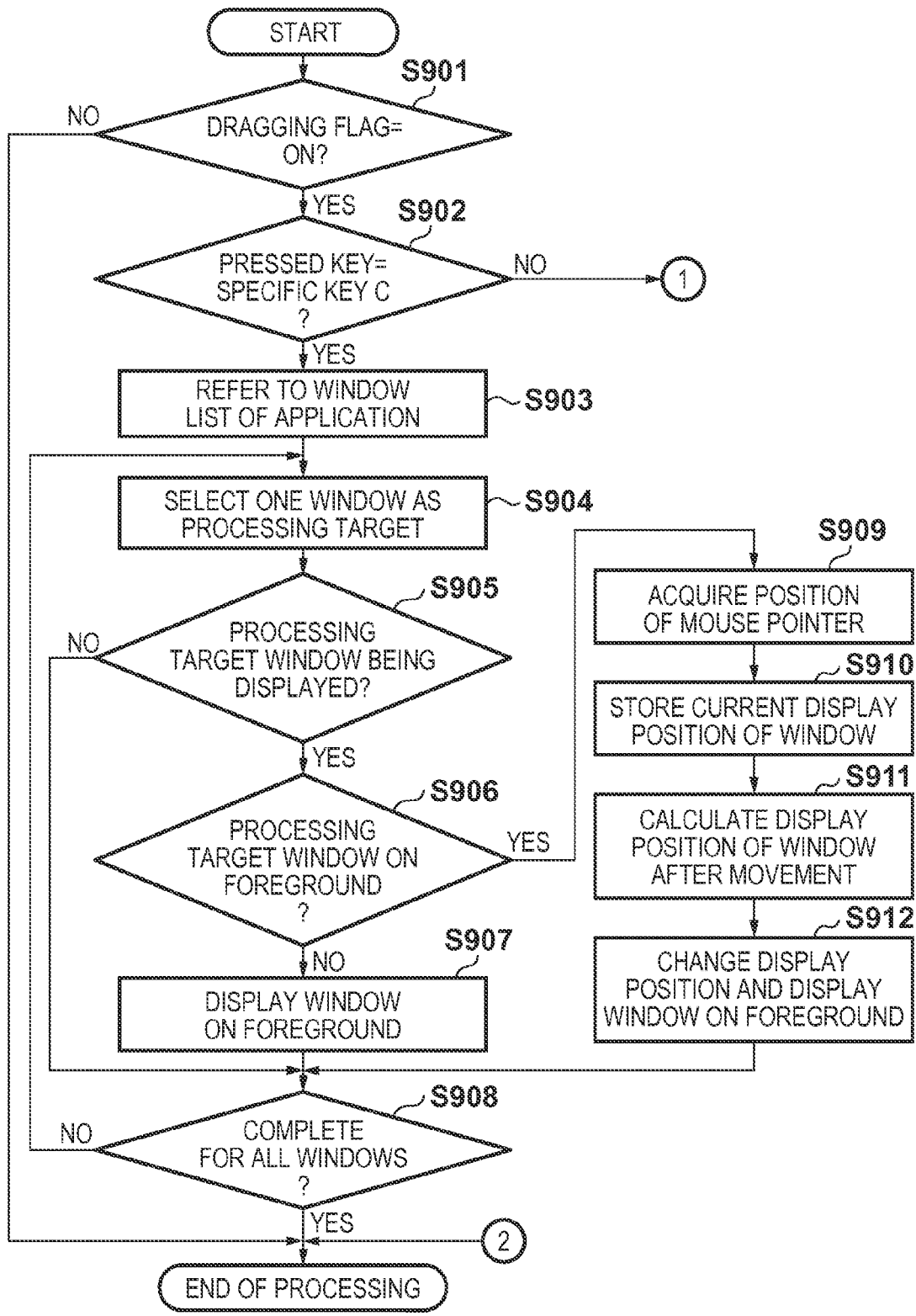

FIGS. 9A and 9B are flowcharts showing an example of the processing sequence of a window control application 200 upon detection of a key operation according to this embodiment. In this embodiment, foreground display processing and neighbor display processing are executed according to a window state when the user presses a key. A user's input operation at a keyboard is detected, and when a window of the window control application 200 has already been displayed on a foreground, the neighbor display processing is executed; when the displayed window is not located on the foreground, the foreground display processing is executed.

Upon detection of a key event, an input management unit 201 determines in step S901 whether or not a drag operation is currently in progress. This determination process is attained by referring to a dragging flag designated in the aforementioned processing of FIG. 7. If a drag operation is not in progress (NO in step S901), this processing sequence ends. If a drag operation is in progress (YES in step S901), the input management unit 201 refers to event information of the key event, and determines in step S902 whether or not the pressed key matches a key used to execute the foreground display processing of a window. Note that a key used in this embodiment can be set on a setting dialog 600 shown in FIG. 6 as in the first embodiment, but only one key is to be set. The set key will be described as a specific key C hereinafter. If the input management unit 201 determines that pressed key matches the specific key C (YES in step S902), it requests an application information management unit 204 to send a print window list managed by the window control application 200 in step S903. Upon reception of the request, the application information management unit 204 returns a print window instance list to the input management unit 201.

After the window list is acquired, the input management unit 201 selects one print window as a processing target in step S904. Subsequently, the input management unit 201 refers to attribute information of the print window and determines in the process of step S905 whether or not the print window as the processing target is currently displayed on the display. If the print window is not currently displayed (NO in step S905), the process jumps to step S908. If the print window is currently displayed (YES in step S905), the input management unit 201 instructs a window display management unit 202 to determine in step S906 whether or not the print window as the processing target is displayed on the foreground. If the print window is not displayed on the foreground (NO in step S906), the input management unit 201 instructs the window display management unit 202 to display the currently displayed print window on the foreground in step S907. More specifically, by enabling foreground display attribute information of the print window, an OS processes to display that window on the foreground on the display.

If the print window is displayed on the foreground (YES in step S906), the input management unit 201 acquires a display position of a mouse pointer on the display from the OS in step S909. Subsequently, in step S910, the input management unit 201 instructs the window display management unit 202 to store the current display position of the print window as the processing target. Upon reception of the instruction, the window display management unit 202 stores the display position of the print window as the processing target on the display. In step S911, the input management unit 201 calculates a position after movement of the print window for the neighbor display based on the position information of the mouse pointer acquired in step S909. The calculation method of the position after movement is the same as that in the first embodiment, and a detailed description thereof will not be repeated.

In step S912, the input management unit 201 instructs the window display management unit 202 to change the position of the print window to that calculated in step S911, and to display the print window as the processing target. After the processes of steps S907 and S912, the input management unit 201 determines in step S908 whether or not the processing is complete for all print windows included in the list acquired in step S903. If the processing is complete for all print windows (YES in step S908), this processing sequence ends. If print windows to be processed still remain (NO in step S908), the input management unit 201 selects one window to be processed as a processing target in step S904.

If the pressed key does not match the specific key C (NO in step S902), the input management unit 201 determines in step S913 whether or not the pressed key matches a cancel key. If the pressed key does not match the cancel key (NO in step S913), this processing sequence ends.

If the pressed key matches the cancel key (YES in step S913), the input management unit 201 inquires the window display management unit 202 to determine in step S914 whether or not execution of the foreground display processing of the print window is currently in progress. If execution of the foreground display processing is not in progress (NO in step S914), the processing ends. If execution of the foreground display processing is in progress (YES in step S914), the input management unit 201 requests the application information management unit 204 to send a print window list managed by the application in step S915. Upon reception of the request, the application information management unit 204 returns a print window instance list to the input management unit 201.

After the window list is acquired, the input management unit 201 refers to attribute information of respective print windows and determines in step S916 whether or not the window list includes a currently displayed print window. If the list does not include any currently displayed window (NO in step S916), this processing sequence ends. If the list includes a currently displayed print window (YES in step S916), the input management unit 201 confirms in step S917 whether or not the currently displayed print window has been moved for the neighbor display. This can be determined by confirming whether or not the original position information of the print window is stored in step S910. Only when the input management unit 201 determines that the print window has been moved (YES in step S917), the input management unit 201 refers to the stored original position information of the print window stored, and puts back the position of the print window to that original position in step S918. In step S919, the input management unit 201 releases the foreground display of the window, and ends the processing.

According to this embodiment, the display control of the print window is executed using one specific key, thus further improving the user's operability.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188929, filed Aug. 29, 2012, which is hereby incorporated by reference herein in its entirety.

What is claimed is:

1. An information processing apparatus comprising:
   a detection unit configured to detect a user's operation of a first specific key of a keyboard during a drag operation of a file;
   a display control unit configured to control to display an object on the foreground if the detection unit detects the user's operation of the first specific key of the keyboard during the drag operation of the file, wherein the display control unit does not control to display the object on the foreground if the detection unit detects the user's operation of the first specific key of the keyboard except during the drag operation of the file;
   a menu display unit configured to control to display a menu for selecting a process to be executed for the dragged file if the dragged file is dragged to the object displayed on the foreground; and
   an executing unit configured to execute a process selected from the displayed menu for the dragged file.

2. The apparatus according to claim 1, wherein the display control unit controls to display the object on the foreground and in a neighborhood of a pointer when the detection unit detects a user's operation of a second specific key of the keyboard during the drag operation of the file.

3. The apparatus according to claim 2, wherein, if the dragged file is released when the object is displayed on the foreground and in the neighborhood of the pointer, the display control unit puts back the object to an original position.

4. The apparatus according to claim 1, wherein the menu displayed by the menu display unit includes at least one of a print process, a FAX transmission process, print preview process and PDF conversion process.

5. An information processing apparatus comprising:
   a detection unit configured to detect a user's operation of a specific key of a keyboard during a drag operation of a file;
   a display control unit configured to control to display an object on the foreground and in a neighborhood of a pointer if the detection unit detects the user's operation of the specific key of the keyboard during the drag operation of the file, wherein the display control unit does not control to display the object on the foreground and in the neighborhood of the pointer if the detection unit detects the user's operation of the specific key of the keyboard except during the drag operation of the file;
   a menu display unit configured to control to display a menu for selecting a process to be executed for the dragged file if the dragged file is dragged to the object displayed on the foreground and in the neighborhood of the pointer; and
   an executing unit configured to execute a process selected from the displayed menu for the dragged file.

6. A control method for an information processing apparatus, the method comprising:
   a detection step of detecting a user's operation of a first specific key of a keyboard during a drag operation of a file;
   a display control step of controlling to display an object on the foreground if the user's operation of the first specific key of the keyboard is detected in the detection step during the drag operation of the file, wherein the object is not controlled to display on the foreground in the display control step if the user's operation of the first specific key of the keyboard is detected in the detection step except during the drag operation of the file;
   a menu display step of controlling to display a menu for selecting a process to be executed for the dragged file if the dragged file is dragged to the object displayed on the foreground; and
   an executing step of executing a process selected from the displayed menu for the dragged file.

7. The method according to claim 6, wherein the object is controlled to display on the foreground and in a neighborhood of a pointer in the display control step when a user's operation of a second specific key of the keyboard is detected in the detection step during the drag operation of the file.

8. The method according to claim 7, wherein, if the dragged file is released when the object is displayed on the foreground and in the neighborhood of the pointer, the object is put back to an original position in the display control step.

9. The method according to claim 6, wherein the menu displayed in the menu display step includes at least one of a print process, a FAX transmission process, print preview process and PDF conversion process.

10. A control method for an information processing apparatus, the method comprising:
    a detection step of detecting a user's operation of a specific key of a keyboard during a drag operation of a file;
    a display control step of controlling to display an object on the foreground and in a neighborhood of a pointer if the user's operation of the specific key of the keyboard is detected in the detection step during the drag operation of the file, wherein the object is not controlled to display on the foreground and in the neighborhood of the pointer in the display control step if the user's operation of the specific key of the keyboard is detected in the detection step except during the drag operation of the file;
    a menu display step of controlling to display a menu for selecting a process to be executed for the dragged file if the dragged file is dragged to the object displayed on the foreground and in the neighborhood of the pointer; and
    an executing step of executing a process selected from the displayed menu for the dragged file.

11. A non-transitory computer-readable storage medium storing a program for controlling a computer to function as:
    a detection unit configured to detect a user's operation of a first specific key of a keyboard during a drag operation of a file;

a display control unit configured to control to display an object on the foreground if the detection unit detects the user's operation of the first specific key of the keyboard during the drag operation of the file, wherein the display control unit does not control to display the object on the foreground if the detection unit detects the user's operation of the first specific key of the keyboard except during the drag operation of the file;

a menu display unit configured to control to display a menu for selecting a process to be executed for the dragged file if the dragged file is dragged to the object displayed on the foreground; and an executing unit configured to execute a process selected from the displayed menu for the dragged file.

12. The medium according to claim 11, wherein the display control unit controls to display the object on the foreground and in a neighborhood of a pointer when the detection unit detects a user's operation of a second specific key of the keyboard during the drag operation of the file.

13. The medium according to claim 12, wherein, if the dragged file is released when the object is displayed on the foreground and in the neighborhood of the pointer, the display control unit puts back the object to an original position.

14. The medium according to claim 11, wherein the menu displayed by the menu display unit includes at least one of a print process, a FAX transmission process, print preview process and PDF conversion process.

15. A non-transitory computer-readable storage medium storing a program for controlling a computer to function as:

a detection unit configured to detect a user's operation of a specific key of a keyboard during a drag operation of a file;

a display control unit configured to control to display an object on the foreground and in a neighborhood of a pointer if the detection unit detects the user's operation of the specific key of the keyboard during the drag operation of the file, wherein the display control unit does not control to display the object on the foreground and in the neighborhood of the pointer if the detection unit detects the user's operation of the specific key of the keyboard except during the drag operation of the file;

a menu display unit configured to control to display a menu for selecting a process to be executed for the dragged file if the dragged file is dragged to the object displayed on the foreground and in the neighborhood of the pointer; and an executing unit configured to execute a process selected from the displayed menu for the dragged file.

* * * * *